Figure 1:
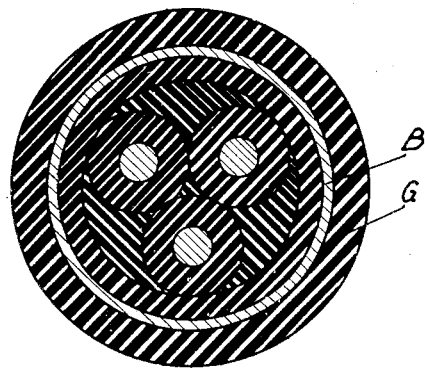
Figure 2:
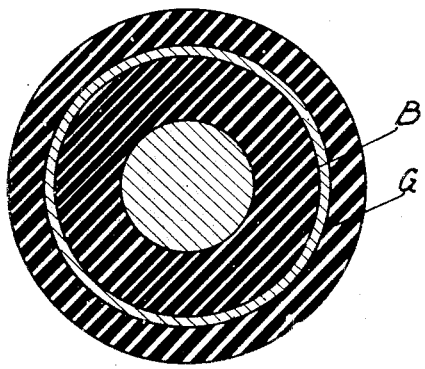
Figure 3:
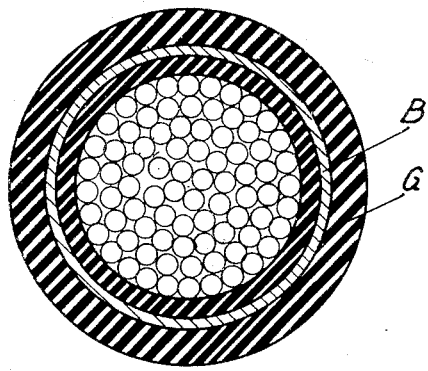

Feb. 19, 1929.

R. APT 1,702,332

ELECTRIC CABLE AND METHOD OF MANUFACTURING SAME

Filed Jan. 9, 1926

Inventor.
Richard Apt

Patented Feb. 19, 1929.

1,702,332

UNITED STATES PATENT OFFICE.

RICHARD APT, OF BERLIN-TREPTOW, GERMANY.

ELECTRIC CABLE AND METHOD OF MANUFACTURING SAME.

Application filed January 9, 1926, Serial No. 80,376, and in Germany January 27, 1925.

Lead-covered electric cables for power transmission and telephonic purposes have for a long time been produced by enclosing the current-carrying core in a seamless lead covering; in cases in which the cables were laid directly in the ground there was arranged over the lead covering, for mechanical protection, the so-called armour consisting of spirally wound layers of iron strip or iron wires which were embedded in impregnated jute. The thickness of the lead covering of the cables was between 1 m.m. and 3.5 m.m. according to the external diameter of the cable. The above described mode of manufacture necessitates the cables being of rather great weight which increases the cost of transport and laying. The thick lead covering however in certain cases introduces disadvantages of another kind. In polyphase current cables it is true, that owing to the twisting or stranding, the several cable elements of the core are symmetrically arranged, but nevertheless inductive action on the lead covering is not wholly eliminated, so that eddy currents are formed therein which occasion losses. Such effects in the lead covering become manifest to a specially great extent in those single cables for alternating or polyphase current power transmission which are preferably employed for very high voltage instead of the cables with a core of three elements. In the transmission of alternating currents through single cables, very considerable voltages are induced in the lead covering and these give rise to eddy-currents.

The lead covering of these cables, however, must for mechanical reasons, be chosen specially thick, since armours of iron cannot be provided at all for such single cables in consequence of the magnetic action. Heavy losses accordingly arise in the thick lead covering of cables so conditioned with respect to their construction, which losses militate against the utility of a single cable (which per se is highly preferable) when transmitting high tension alternating currents.

The lead covered cables manufactured heretofore have the further drawback that in consequence of the fact that armours made as above described constitute only ineffective electric insulation, stray currents penetrate the lead covering from distant circuits, for example, from street railways, and in certain circumstances these cause extensive damage. Moreover, the lead coverings are readily attacked by chemical action, for example, in chemical works and lime-pit plants and the like.

In the case of single cables for the transmission of high tension alternating currents, it is of special importance to provide the lead covering with a well insulated protective jacket since, as stated, voltages are induced in the lead coverings of these cables so that arcs may be formed by mutual contact between adjacent cables, which arcs may likewise cut away the lead coverings.

Lead covered telephone cables are either drawn as cables into cement conduits, or, being provided with the usual iron armour, are embedded in the ground. In these cables also the lack of a suitable protective jacket has been found to lead to trouble. Lead is attacked chemically by cement and when the cable is laid directly in the ground, stray currents and chemical action may come into play, as in the case of large current cables.

The subject matter of the present invention is a lead covered cable wherein the above described disadvantages are avoided, in that the lead covering is in part replaced by a covering of rubber. The lead covering can thus be of a very small thickness so dimensioned that it is just within the possibility of applying a seamless lead covering. Enclosure of the core of the cable with a metal covering remains necessary in order to protect the insulating material of the cable core and in order to limit the electric field outwardly. There is then arranged over the lead covering the jacket of rubber of sufficient thickness, which is caused to unite with or tightly enclose and protect the lead covering from mechanical, chemical and electrical action and the duty of which, at the same time, is to replace the strip-iron armour. Where the danger of pronounced mechanical action appears to require it, there may of course be arranged over the rubber jacket an armour of iron. In order to secure as tight an enclosure as possible it is preferred to so compose the rubber mixture that at vulcanization an intimate connection between lead covering and rubber coating is produced. This may be effected, for example, by mixing with the rubber mixture an excess of sulphur so that when there is contact with the lead of the lead covering, sulphide of lead is formed, which binds securely together the lead covering and rubber jacket. Alternatively, by coating the lead covering with a solution containing sulphur and rubber, the lead cov-